US008933876B2

(12) United States Patent
Galor et al.

(10) Patent No.: US 8,933,876 B2
(45) Date of Patent: Jan. 13, 2015

(54) THREE DIMENSIONAL USER INTERFACE SESSION CONTROL

(75) Inventors: Micha Galor, Tel Aviv (IL); Jonathan Pokrass, Bat-Yam (IL); Amir Hoffnung, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 13/314,210

(22) Filed: Dec. 8, 2011

(65) Prior Publication Data

US 2012/0313848 A1 Dec. 13, 2012

Related U.S. Application Data

(60) Provisional application No. 61/422,239, filed on Dec. 13, 2010.

(51) Int. Cl.
*G09G 5/00* (2006.01)
*G06F 3/00* (2006.01)
*G06F 3/01* (2006.01)
*G06F 3/03* (2006.01)

(52) U.S. Cl.
CPC ............... *G06F 3/005* (2013.01); *G06F 3/017* (2013.01); *G06F 3/0304* (2013.01)
USPC .......................................... 345/156; 715/863

(58) Field of Classification Search
CPC .................................. G06F 3/017; G06F 3/011
USPC ............................. 345/156–158; 715/700–866
See application file for complete search history.

(56) References Cited

U.S. PATENT DOCUMENTS

| 4,550,250 A | 10/1985 | Mueller et al. |
| 4,789,921 A * | 12/1988 | Aho ............................. 362/348 |
| 4,988,981 A | 1/1991 | Zimmerman et al. |
| 5,264,836 A | 11/1993 | Rubin |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |

(Continued)

FOREIGN PATENT DOCUMENTS

| WO | 9935633 A2 | 7/1999 |
| WO | 03071410 A2 | 8/2003 |

(Continued)

OTHER PUBLICATIONS

Ross Miller, "Kinect for Xbox 360 review", Nov. 4, 2010, Engadget.*

(Continued)

*Primary Examiner* — Michael Pervan
(74) *Attorney, Agent, or Firm* — D Kligler I.P. Services Ltd

(57) ABSTRACT

A method, including receiving, by a computer executing a non-tactile three dimensional (3D) user interface, a set of multiple 3D coordinates representing a gesture by a hand positioned within a field of view of a sensing device coupled to the computer, the gesture including a first motion in a first direction along a selected axis in space, followed by a second motion in a second direction, opposite to the first direction, along the selected axis. Upon detecting completion of the gesture, the non-tactile 3D user interface is transitioned from a first state to a second state.

12 Claims, 5 Drawing Sheets

(56) References Cited

U.S. PATENT DOCUMENTS

| | | | |
|---|---|---|---|
| 5,864,635 A | 1/1999 | Zetts et al. | |
| 5,870,196 A | 2/1999 | Lulli et al. | |
| 5,917,937 A | 6/1999 | Szeliski et al. | |
| 5,973,700 A | 10/1999 | Taylor et al. | |
| 6,002,808 A | 12/1999 | Freeman | |
| 6,005,548 A | 12/1999 | Latypov et al. | |
| 6,064,387 A | 5/2000 | Canaday et al. | |
| 6,072,494 A | 6/2000 | Nguyen | |
| 6,084,979 A | 7/2000 | Kanade et al. | |
| 6,111,580 A | 8/2000 | Kazama et al. | |
| 6,191,773 B1 | 2/2001 | Maruno et al. | |
| 6,215,890 B1 | 4/2001 | Matsuo et al. | |
| 6,243,054 B1 | 6/2001 | DeLuca | |
| 6,252,988 B1 | 6/2001 | Ho | |
| 6,256,033 B1 | 7/2001 | Nguyen | |
| 6,262,740 B1 | 7/2001 | Lauer et al. | |
| 6,345,111 B1 | 2/2002 | Yamaguchi et al. | |
| 6,345,893 B2 | 2/2002 | Fateh et al. | |
| 6,452,584 B1 | 9/2002 | Walker et al. | |
| 6,456,262 B1 | 9/2002 | Bell | |
| 6,507,353 B1 | 1/2003 | Huard et al. | |
| 6,512,838 B1 | 1/2003 | Rafii et al. | |
| 6,519,363 B1 | 2/2003 | Su et al. | |
| 6,559,813 B1 | 5/2003 | DeLuca et al. | |
| 6,681,031 B2 | 1/2004 | Cohen et al. | |
| 6,686,921 B1 | 2/2004 | Rushmeier et al. | |
| 6,690,370 B2 | 2/2004 | Ellenby et al. | |
| 6,741,251 B2 | 5/2004 | Malzbender | |
| 6,791,540 B1 | 9/2004 | Baumberg | |
| 6,803,928 B2 | 10/2004 | Bimber et al. | |
| 6,853,935 B2 | 2/2005 | Satoh et al. | |
| 6,857,746 B2 | 2/2005 | Dyner | |
| 6,951,515 B2 | 10/2005 | Ohshima et al. | |
| 6,977,654 B2 | 12/2005 | Malik et al. | |
| 7,003,134 B1 | 2/2006 | Covell et al. | |
| 7,013,046 B2 | 3/2006 | Kawamura et al. | |
| 7,023,436 B2 | 4/2006 | Segawa et al. | |
| 7,042,440 B2 | 5/2006 | Pryor et al. | |
| 7,042,442 B1 | 5/2006 | Kanevsky et al. | |
| 7,151,530 B2 | 12/2006 | Roeber et al. | |
| 7,170,492 B2 | 1/2007 | Bell | |
| 7,215,815 B2 | 5/2007 | Honda | |
| 7,227,526 B2 | 6/2007 | Hildreth et al. | |
| 7,257,237 B1 | 8/2007 | Luck et al. | |
| 7,259,747 B2 | 8/2007 | Bell | |
| 7,264,554 B2 | 9/2007 | Bentley | |
| 7,289,227 B2 | 10/2007 | Smetak et al. | |
| 7,289,645 B2 | 10/2007 | Yamamoto et al. | |
| 7,295,697 B1 | 11/2007 | Satoh | |
| 7,301,648 B2 | 11/2007 | Foxlin | |
| 7,302,099 B2 | 11/2007 | Zhang et al. | |
| 7,333,113 B2 | 2/2008 | Gordon | |
| 7,340,077 B2 | 3/2008 | Gokturk | |
| 7,340,399 B2 | 3/2008 | Friedrich et al. | |
| 7,348,963 B2 | 3/2008 | Bell | |
| 7,358,972 B2 | 4/2008 | Gordon et al. | |
| 7,370,883 B2 | 5/2008 | Basir et al. | |
| 7,427,996 B2 | 9/2008 | Yonezawa et al. | |
| 7,428,542 B1 | 9/2008 | Fink et al. | |
| 7,474,256 B2 | 1/2009 | Ohta et al. | |
| 7,508,377 B2 | 3/2009 | Pihlaja et al. | |
| 7,526,120 B2 | 4/2009 | Gokturk et al. | |
| 7,536,032 B2 | 5/2009 | Bell | |
| 7,573,480 B2 | 8/2009 | Gordon | |
| 7,576,727 B2 | 8/2009 | Bell | |
| 7,580,572 B2 | 8/2009 | Bang et al. | |
| 7,590,941 B2 | 9/2009 | Wee et al. | |
| 7,688,998 B2 | 3/2010 | Tuma et al. | |
| 7,696,876 B2 | 4/2010 | Dimmer et al. | |
| 7,724,250 B2 | 5/2010 | Ishii et al. | |
| 7,762,665 B2 | 7/2010 | Vertegaal et al. | |
| 7,774,155 B2 | 8/2010 | Sato et al. | |
| 7,812,842 B2 | 10/2010 | Gordon | |
| 7,821,541 B2 | 10/2010 | Delean | |
| 7,840,031 B2 | 11/2010 | Albertson et al. | |
| 7,844,914 B2 | 11/2010 | Andre et al. | |
| 7,925,549 B2 | 4/2011 | Looney et al. | |
| 7,971,156 B2 | 6/2011 | Albertson et al. | |
| 8,154,781 B2 | 4/2012 | Kroll et al. | |
| 8,166,421 B2 * | 4/2012 | Magal et al. | 715/863 |
| 8,183,977 B2 | 5/2012 | Matsumoto | |
| 8,194,921 B2 | 6/2012 | Kongqiao et al. | |
| 8,214,098 B2 | 7/2012 | Murray et al. | |
| 8,218,211 B2 | 7/2012 | Kroll et al. | |
| 8,368,647 B2 | 2/2013 | Lin | |
| 8,405,604 B2 | 3/2013 | Pryor et al. | |
| 8,416,276 B2 | 4/2013 | Kroll et al. | |
| 8,446,459 B2 | 5/2013 | Fang et al. | |
| 8,448,083 B1 | 5/2013 | Migos et al. | |
| 8,462,199 B2 | 6/2013 | Givon | |
| 8,514,221 B2 | 8/2013 | King et al. | |
| 8,514,251 B2 | 8/2013 | Hildreth et al. | |
| 8,625,882 B2 | 1/2014 | Backlund et al. | |
| 2002/0057383 A1 | 5/2002 | Iwamura | |
| 2002/0071607 A1 | 6/2002 | Kawamura et al. | |
| 2002/0158873 A1 | 10/2002 | Williamson | |
| 2003/0057972 A1 | 3/2003 | Pfaff et al. | |
| 2003/0063775 A1 | 4/2003 | Rafii et al. | |
| 2003/0088463 A1 | 5/2003 | Kanevsky | |
| 2003/0156756 A1 | 8/2003 | Gokturk et al. | |
| 2003/0185444 A1 | 10/2003 | Honda | |
| 2003/0227453 A1 | 12/2003 | Beier et al. | |
| 2003/0235341 A1 | 12/2003 | Gokturk et al. | |
| 2004/0046744 A1 | 3/2004 | Rafii et al. | |
| 2004/0104935 A1 | 6/2004 | Williamson | |
| 2004/0135744 A1 | 7/2004 | Bimber et al. | |
| 2004/0155962 A1 | 8/2004 | Marks | |
| 2004/0174770 A1 | 9/2004 | Rees | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0193413 A1 | 9/2004 | Wilson et al. | |
| 2004/0222977 A1 | 11/2004 | Bear et al. | |
| 2004/0258314 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0110964 A1 | 5/2005 | Bell et al. | |
| 2005/0122308 A1 | 6/2005 | Bell et al. | |
| 2005/0162381 A1 | 7/2005 | Bell et al. | |
| 2005/0190972 A1 | 9/2005 | Thomas et al. | |
| 2005/0254726 A1 | 11/2005 | Fuchs et al. | |
| 2005/0265583 A1 | 12/2005 | Covell et al. | |
| 2006/0010400 A1 | 1/2006 | Dehlin et al. | |
| 2006/0092138 A1 | 5/2006 | Kim et al. | |
| 2006/0110008 A1 | 5/2006 | Vertegaal et al. | |
| 2006/0115155 A1 | 6/2006 | Lui et al. | |
| 2006/0139314 A1 | 6/2006 | Bell | |
| 2006/0149737 A1 | 7/2006 | Du et al. | |
| 2006/0159344 A1 | 7/2006 | Shao et al. | |
| 2006/0187196 A1 | 8/2006 | Underkoffler et al. | |
| 2006/0239670 A1 | 10/2006 | Cleveland | |
| 2006/0248475 A1 | 11/2006 | Abrahamsson | |
| 2007/0078552 A1 | 4/2007 | Rosenberg | |
| 2007/0130547 A1 | 6/2007 | Boillot | |
| 2007/0154116 A1 | 7/2007 | Shieh | |
| 2007/0230789 A1 | 10/2007 | Chang et al. | |
| 2007/0285554 A1 | 12/2007 | Givon | |
| 2008/0030460 A1 | 2/2008 | Hildreth et al. | |
| 2008/0062123 A1 | 3/2008 | Bell | |
| 2008/0094371 A1 | 4/2008 | Forstall et al. | |
| 2008/0123940 A1 | 5/2008 | Kundu et al. | |
| 2008/0150890 A1 | 6/2008 | Bell et al. | |
| 2008/0150913 A1 | 6/2008 | Bell et al. | |
| 2008/0170776 A1 | 7/2008 | Albertson et al. | |
| 2008/0236902 A1 | 10/2008 | Imaizumi | |
| 2008/0252596 A1 | 10/2008 | Bell et al. | |
| 2008/0256494 A1 | 10/2008 | Greenfield | |
| 2008/0260250 A1 | 10/2008 | Vardi | |
| 2008/0281583 A1 | 11/2008 | Slothouber et al. | |
| 2008/0287189 A1 | 11/2008 | Rabin | |
| 2009/0009593 A1 | 1/2009 | Cameron et al. | |
| 2009/0027335 A1 | 1/2009 | Ye | |
| 2009/0027337 A1 | 1/2009 | Hildreth | |

(56) References Cited

U.S. PATENT DOCUMENTS

| | | |
|---|---|---|
| 2009/0031240 A1 | 1/2009 | Hildreth |
| 2009/0040215 A1 | 2/2009 | Afzulpurkar et al. |
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1* | 9/2009 | Hildreth ................... 715/863 |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0071965 A1 | 3/2010 | Hu et al. |
| 2010/0083189 A1 | 4/2010 | Arlein et al. |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1* | 8/2010 | Latta et al. ................ 715/863 |
| 2010/0199231 A1 | 8/2010 | Markovic et al. |
| 2010/0234094 A1 | 9/2010 | Gagner et al. |
| 2010/0235786 A1 | 9/2010 | Meizels et al. |
| 2010/0295781 A1 | 11/2010 | Alameh et al. |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1* | 4/2011 | Swink et al. ............... 715/863 |
| 2011/0144543 A1 | 6/2011 | Tsuzuki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0038550 A1 | 2/2012 | Lemmey et al. |
| 2012/0078614 A1 | 3/2012 | Galor et al. |
| 2012/0117514 A1 | 5/2012 | Kim et al. |
| 2012/0169583 A1 | 7/2012 | Rippel et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0313848 A1 | 12/2012 | Galor et al. |
| 2012/0320080 A1 | 12/2012 | Giese et al. |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0155070 A1 | 6/2013 | Luo |
| 2013/0207920 A1 | 8/2013 | McCann et al. |
| 2014/0108930 A1 | 4/2014 | Asnis |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2012011044 A1 | 1/2012 |
| WO | 2012020380 A1 | 2/2012 |
| WO | 2012107892 A1 | 8/2012 |

OTHER PUBLICATIONS

International Application PCT/IB2012/050577 Search Report dated Aug. 6, 2012.

U.S. Appl. No. 12/683,452 Official Action dated Sep. 7, 2012.

Koutek, M., "Scientific Visualization in Virtual Reality: Interaction Techniques and Application Development", PhD Thesis, Delft University of Technology, 264 pages, Jan. 2003.

Azuma et al., "Recent Advances in Augmented Reality", IEEE Computer Graphics and Applications, vol. 21, issue 6, pp. 34-47, Nov. 2001.

Breen et al., "Interactive Occlusion and Collision of Real and Virtual Objects in Augmented Reality", Technical Report ECRC-95-02, ECRC, Munich, Germany, 22 pages, year 1995.

Burdea et al., "A Distributed Virtual Environment with Dextrous Force Feedback", Proceedings of Interface to Real and Virtual Worlds Conference, pp. 255-265, Mar. 1992.

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

Ohta et al., "Share-Z: Client/Server Depth Sensing for See-Through Head-Mounted Displays", Presence: Teleoperators and Virtual Environments, vol. 11, No. 2, pp. 176-188, Apr. 2002.

Schmalstieg et al., "The Studierstube Augmented Reality Project", Presence: Teleoperators and Virtual Environments, vol. 11, No. 1, pp. 33-54, Feb. 2002.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

U.S. Appl. No. 13/541,786, filed Jul. 5, 2012.

U.S. Appl. No. 13/592,352, filed Aug. 23, 2012.

U.S. Appl. No. 13/584,831, filed Aug. 14, 2012.

U.S. Appl. No. 13/592,369, filed Aug. 23, 2012.

Hart, D., U.S. Appl. No. 09/616,606 "Method and System for High Resolution, Ultra Fast 3-D Imaging" filed Jul. 14, 2000.

International Application PCT/IL2007/000306 Search Report dated Oct. 2, 2008.

International Application PCT/IL2007/000574 Search Report dated Sep. 10, 2008.

International Application PCT/IL2006/000335 Preliminary Report on Patentability dated Apr. 24, 2008.

Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.

(56) References Cited

OTHER PUBLICATIONS

Leclerc et al., "The direct computation of height from shading", The Proceedings of the IEEE Computer Society Conference on Computer Vision and Pattern Recognition (CVPR), pp. 552-558, USA, Jun. 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", IEEE Computer Society Conference on Computer Vision and Pattern Recognition (CVPR), pp. 508-513, Jun. 21-23, 1994.

Horn, B., "Height and gradient from shading", International Journal of Computer Vision, vol. 5, No. 1, pp. 37-76, Aug. 1990.

Bruckstein, A., "On shape from shading", Computer Vision, Graphics & Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.

Besl, P., "Active, Optical Range Imaging Sensors", Machine vision and applications, vol. 1, pp. 127-152, year 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.

Winkelbach et al., "Shape from Single Stripe Pattern Illumination", Luc Van Gool (Editor), (DAGM 2002), Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.

Kimmel et al., "Analyzing and synthesizing images by evolving curves with the Osher-Sethian method", International Journal of Computer Vision, vol. 24, No. 1, pp. 37-56, year 1997.

Zigelman et al., "Texture mapping using surface flattening via multi-dimensional scaling", IEEE Transactions on Visualization and Computer Graphics, vol. 8, No. 2, pp. 198-207, Apr. 2002.

Dainty, J.C., "Introduction", Laser Speckle and Related Phenomena, pp. 1-7, Springer-Verlag, Berlin Heidelberg, 1975.

Mendlovic et al., "Composite harmonic filters for scale, projection and shift invariant pattern recognition", Applied Optics Journal, vol. 34, No. 2, Jan. 10, 1995.

Fua et al., "Human Shape and Motion Recovery Using Animation Models", 19th Congress, International Society for Photogrammetry and Remote Sensing, Amsterdam, The Netherlands, Jul. 2000.

Allard et al., "Marker-less Real Time 3D modeling for Virtual Reality", Immersive Projection Technology, Iowa State University, year 2004.

Howe et al., "Bayesian Reconstruction of 3D Human Motion from Single-Camera Video", Advanced in Neural Information Processing Systems, vol. 12, pp. 820-826, USA 1999.

Li et al., "Real-Time 3D Motion Tracking with Known Geometric Models", Real-Time Imaging Journal, vol. 5, pp. 167-187, Academic Press 1999.

Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.

Segen et al., "Shadow gestures: 3D hand pose estimation using a single camera", Proceedings of IEEE International Conference on Computer Vision and Pattern Recognition, pp. 479-485, Fort Collins, USA, 1999.

Vogler et al., "ASL recognition based on a coupling between HMMs and 3D motion analysis", Proceedings of IEEE International Conference on Computer Vision, pp. 363-369, Mumbai, India, 1998.

Nam et al., "Recognition of Hand Gestures with 3D, Nonlinear Arm Movements", Pattern Recognition Letters, vol. 18, No. 1, pp. 105-113, Elsevier Science B.V. 1997.

Nesbat, S., "A System for Fast, Full-Text Entry for Small Electronic Devices", Proceedings of the 5th International Conference on Multimodal Interfaces, ICMI 2003, Vancouver, Nov. 5-7, 2003.

Ascension Technology Corporation, "Flock of Birds: Real-Time Motion Tracking", 2008.

Segen et al., "Human-computer interaction using gesture recognition and 3D hand tracking", ICIP 98, Proceedings of the IEEE International Conference on Image Processing, vol. 3, pp. 188-192, Oct. 4-7, 1998.

Dekker, L., "Building Symbolic Information for 3D Human Body Modeling from Range Data", Proceedings of the Second International Conference on 3D Digital Imaging and Modeling, IEEE computer Society, pp. 388-397, 1999.

Holte et al., "Gesture Recognition using a Range Camera", Technical Report CVMT-07-01 ISSN 1601-3646, Feb. 2007.

Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.

U.S. Appl. No. 61/523,404, filed Aug. 15, 2011.
U.S. Appl. No. 61/504,339, filed Jul. 5, 2011.
U.S. Appl. No. 61/521,448, filed Aug. 9, 2011.
U.S. Appl. No. 61/523,349, filed Aug. 14, 2011.

Primesense, "Natural Interaction", YouTube Presentation, Jun. 9, 2010 http://www.youtube.com/watch?v=TzLKsex43z1~.

U.S. Appl. No. 13/423,322, filed Mar. 19, 2012.
U.S. Appl. No. 13/423,314, filed Mar. 19, 2012.

Tobii Technology, "The World Leader in Eye Tracking and Gaze Interaction", Mar. 2012.

Noveron, "Madison video eyewear", year 2012.

U.S. Appl. No. 12/762,336 Official Action dated May 15, 2012.

Manning et al., "Foundations of Statistical Natural Language Processing", chapters 6,7,9 and 12, MIT Press 1999.

Commission Regulation (EC) No. 1275/2008, Official Journal of the European Union, Dec. 17, 2008.

Arm Ltd., "AMBA Specification: AHB", Version 2, pp. 35-92, year 1999.

Primesense Corporation, "PrimeSensor NITE 1.1", USA, year 2010.

Microvision Inc., "PicoP® Display Engine—How it Works", 1996-2012.

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

Gesturetec Inc., "Gesture Control Solutions for Consumer Devices", Canada, 2009.

Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.

Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.

Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.

(56) References Cited

OTHER PUBLICATIONS

Haritaoglu et al., "W4S : A real-time system for detecting and tracking people in 2<½>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCCV '00—Proceedings of the 6th European Conference on Computer Vision-Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
PrimeSense Corporation, "PrimeSensor Reference Design 1.08", USA, year 2010.
International Application PCT/IB2012/050577 filed on Feb. 9, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 13/295,106, filed Nov. 14, 2011.
U.S. Appl. No. 61/538,970, filed Sep. 26, 2011.
U.S. Appl. No. 61/526,696, filed Aug. 24, 2011.
U.S. Appl. No. 61/526,692, filed Aug. 24, 2011.
U.S. Appl. No. 13/314,207, filed Dec. 8, 2011.
U.S. Appl. No. 12/352,622 Official Action dated Sep. 30, 2011.
International Application PCT/IB2011/053192 Search Report dated Dec. 6, 2011.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces" filed Feb. 27, 2013.
Berenson et al., U.S. Appl. No. 13/904,050 "Zoom-based gesture user interface" filed May 29, 2013.
Berenson et al., U.S. Appl. No. 13/904,052 "Gesture-based interface with enhanced features" filed May 29, 2013.
Bychkov et al., U.S. Appl. No. 13/849,514 "Gaze-enhanced Virtual Touchscreen" filed Mar. 24, 2013.
Guendelman et al., U.S. Appl. No. 13/849,514 "Enhanced Virtual Touchpad" filed Mar. 24, 2013.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
U.S. Appl. No. 13/314,207 Office Action dated Aug. 5, 2013.
U.S. Appl. No. 13/161,508 Office Action dated Sep. 9, 2013.
International Application PCT/IB2013/052332 Search Report dated Aug. 26, 2013.

(56) References Cited

OTHER PUBLICATIONS

U.S. Appl. No. 13/541,786 Office Action dated Feb. 13, 2014.
U.S. Appl. No. 13/584,831 Office Action dated Mar. 20, 2014.
U.S. Appl. No. 13/314,207 Office Action dated Apr. 3, 2014.
U.S. Appl. No. 12/683,452 Office Action dated Jan. 22, 2014.
U.S. Appl. No. 13/423,322 Office Action dated Apr. 7, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer-Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.
U.S. Appl. No. 12/683,452 Office Action dated Nov. 21, 2014.
U.S. Appl. No. 14/055,997 Office Action dated Nov. 21, 2014.
U.S. Appl. No. 13/592,352 Office Action dated Oct. 2, 2014.
Scharstein, D., "Stereo vision for view synthesis", Proceedings of IEEE Conference on Computer Vision and Pattern Recognition, pp. 852-858, year 1996.
Zhu et al., "Generation and Error Characterization of Pararell-Perspective Stereo Mosaics from Real Video", In-Video Registration, Springer, US, chapter 4, pp. 72-105, year 2003.
Chai et al., "Parallel Projections for Stereo Reconstruction", Proceedings of IEEE Conference on Computer Vision and Pattern Recognition, vol. 2, pp. 493-500, year 2000.
Evers et al., "Image-based rendering of complex scenes from multi-camera rig", IEEE Proceedings on Vision, Image and Signal Processing, vol. 152, No. 4, pp. 470-480, Aug. 5, 2005.
Evers et al., "Image-based Interactive rendering with view dependent geometry", Computer Graphics Forum, (Eurographics '03), vol. 22, No. 3, pp. 573-582, year 2003.
Kauff et al., "Depth map creation and image-based rendering for advanced 3DTV Services Providing Interoperability and Scalability", Signal Processing: Image Communication, vol. 22, No. 2, pp. 217-234, year 2007.

* cited by examiner

US 8,933,876 B2

THREE DIMENSIONAL USER INTERFACE SESSION CONTROL

CROSS-REFERENCE TO RELATED APPLICATIONS

This application claims the benefit of U.S. Provisional Patent Application 61/422,239, filed Dec. 13, 2010, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including receiving, by a computer executing a non-tactile three dimensional (3D) user interface, a set of multiple 3D coordinates representing a gesture by a hand positioned within a field of view of a sensing device coupled to the computer, the gesture including a first motion in a first direction along a selected axis in space, followed by a second motion in a second direction, opposite to the first direction, along the selected axis, and transitioning the non-tactile 3D user interface from a first state to a second state upon detecting completion of the gesture.

There is also provided, in accordance with an embodiment of the present invention a method, including receiving, by a computer executing a non-tactile three dimensional (3D) user interface, a set of multiple 3D coordinates representing a gesture by a hand positioned within a field of view of a sensing device coupled to the computer, the gesture including a rising motion along a vertical axis in space, and transitioning the non-tactile 3D user interface from a locked state to an unlocked state upon detecting completion of the gesture.

There is additionally provided, in accordance with an embodiment of the present invention a method, including associating, in a computer executing a non-tactile three dimensional (3D) user interface, multiple regions, including at least first and second regions, within a field of view of a sensing device coupled to the computer with respective states of the non-tactile 3D user interface, including at least first and second states associated respectively with the first and second regions, receiving a set of multiple 3D coordinates representing a hand movement from the first region to the second region, and responsively to the movement, transitioning the non-tactile 3D user interface from the first state to the second state.

There is further provided, in accordance with an embodiment of the present invention an apparatus, including a three dimensional (3D) optical sensor having a field of view and coupled to a computer executing a non-tactile three dimensional (3D) user interface, and an illumination element that when illuminated, is configured to be visible to a user when the user is positioned within the field of view.

There is additionally provided, in accordance with an embodiment of the present invention an apparatus, including a sensing device, and a computer executing a non-tactile three dimensional (3D) user interface and configured to receive, from the sensing device, a set of multiple 3D coordinates representing a gesture by a hand positioned within a field of view of the sensing device, the gesture including a first motion in a first direction along a selected axis in space, followed by a second motion in a second direction, opposite to the first direction, along the selected axis, and to transition the non-tactile 3D user interface from a first state to a second state upon detecting completion of the gesture.

There is also provided, in accordance with an embodiment of the present invention an apparatus, including a sensing device, and a computer executing a non-tactile three dimensional (3D) user interface and configured to receive, from the sensing device, a set of multiple 3D coordinates representing a gesture by a hand positioned within a field of view of the sensing device, the gesture including a rising motion along a vertical axis in space, and to transition the non-tactile 3D user interface from a locked state to an unlocked state upon detecting completion of the gesture.

There is alternatively provided, in accordance with an embodiment of the present invention an apparatus, including a sensing device, and a computer executing a non-tactile three dimensional (3D) user interface and configured to associate multiple regions, including at least first and second regions, within a field of view of the sensing device with respective states of the non-tactile 3D user interface, including at least first and second states associated respectively with the first and second regions, to receive a set of multiple 3D coordinates representing a hand movement from the first region to the second region, and responsively to the movement, to transition the non-tactile 3D user interface from the first state to the second state.

There is also provided, in accordance with an embodiment of the present invention a computer software product including a non-transitory computer-readable medium, in which program instructions are stored, which instructions, when read by a computer executing a non-tactile user interface, cause the computer to receive, from a sensing device, a set of multiple 3D coordinates representing a gesture by a hand positioned within a field of view of the sensing device, the gesture including a first motion in a first direction along a selected axis in space, followed by a second motion in a second direction, opposite to the first direction, along the selected axis, and to transition the non-tactile 3D user interface from a first state to a second state upon detecting completion of the gesture.

There is additionally provided, in accordance with an embodiment of the present invention a computer software product including a non-transitory computer-readable medium, in which program instructions are stored, which instructions, when read by a computer executing a non-tactile user interface, cause the computer to receive, from a sensing device, a set of multiple 3D coordinates representing a gesture by a hand positioned within a field of view of the sensing device, the gesture including a rising motion along a vertical axis in space, and to transition the non-tactile 3D user interface from a locked state to an unlocked state upon detecting completion of the gesture.

There is further provided, in accordance with an embodiment of the present invention a computer software product including a non-transitory computer-readable medium, in which program instructions are stored, which instructions, when read by a computer executing a non-tactile user interface, cause the computer to associate multiple regions, including at least first and second regions, within a field of view of a sensing device with respective states of the non-tactile 3D user interface, including at least first and second states associated respectively with the first and second regions, to receiving a set of multiple 3D coordinates representing a hand movement from the first region to the second region, and responsively to the movement, to transition the non-tactile 3D user interface from the first state to the second state.

BRIEF DESCRIPTION OF THE DRAWINGS

The disclosure is herein described, by way of example only, with reference to the accompanying drawings, wherein.

DETAILED DESCRIPTION OF EMBODIMENTS

When using physical tactile input devices such as buttons, rollers or touch screens, a user typically engages and disengages control of a user interface by touching and/or manipulating the physical device. Embodiments of the present invention describe gestures for engaging and disengaging control of a user interface based on three-dimensional (3D) sensing (referred to herein as a non-tactile 3D user interface), by a 3D sensor, of motion or change of position of one or more body parts, typically a hand, of the user. Gestures described herein include focus gestures and unlock gestures. A focus gesture enables the user to engage (i.e., take control of) an inactive non-tactile 3D user interface. An unlock gesture enables the user to engage a locked non-tactile 3D user interface, as pressing a specific sequence of keys unlocks a locked cellular phone. In some embodiments, the non-tactile 3D user interface conveys visual feedback to the user performing the focus and the unlock gestures.

Embodiments of the present invention also describe methods for conveying visual feedback to the user, when the user's hand disengages from the non-tactile 3D user interface. The visual feedback typically alerts the user in an unobtrusive manner, thereby enhancing the user's experience.

As described supra, a 3D sensor captures 3D information regarding an object, typically a body part such as a hand, in an interactive area located in front of a display screen. Since the 3D sensor typically has a fixed field of view, a computer can track and accept inputs from the user when the body part is positioned within the field of view. Embodiments of the present invention describe methods and systems for conveying visual feedback to the user when the body part is within the field of view, outside the field of view, and when the user is at the periphery of the field of view.

System Description

Figure 1:
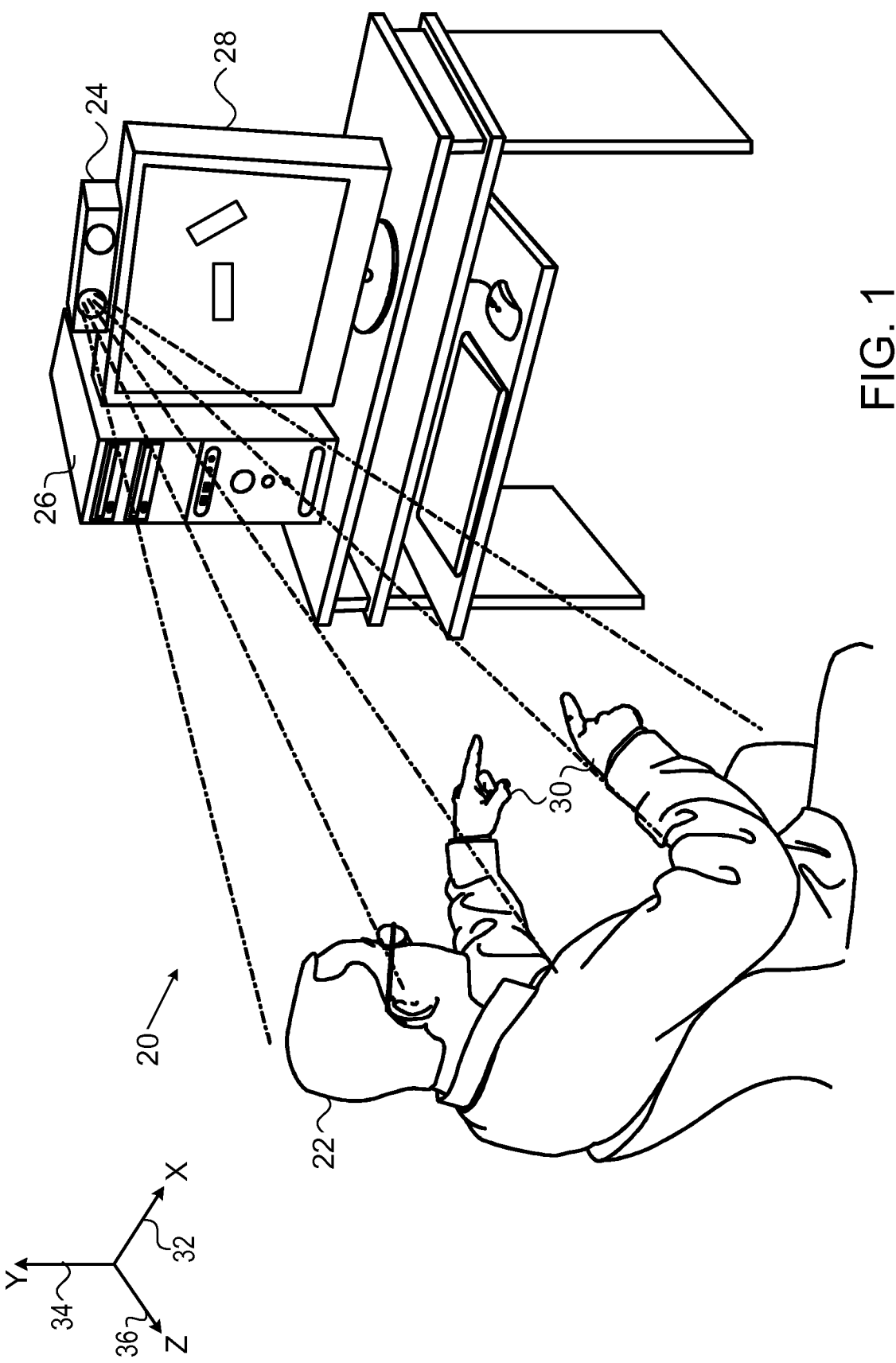
FIG. 1 is a schematic, pictorial illustration of a non-tactile 3D user interface for a computer system, in accordance with an embodiment of the present invention.

FIG. 1 is a schematic, pictorial illustration of a non-tactile 3D user interface 20 (also referred to herein as the user interface) for operation by a user 22 of a computer 26, in accordance with an embodiment of the present invention. The non-tactile 3D user interface is based on a 3D sensing device 24 coupled to the computer, which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 accordingly.

Computer 26, executing 3D user interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Focus Gestures

In the embodiments described herein, user interface 20 comprises the following individual states:

Unlocked/Locked. While locked, user interface 20 typically ignores all gestures except for an unlock gesture (described hereinbelow) that transitions the non-tactile 3D user interface to an unlocked state. When unlocked, gestures, such as those from hand 30, can interact with user interface 20.

Tracked/Not-tracked. In embodiments of the present invention, tracking refers to user interface 20 focusing on a specific body part of an individual in order for the user to interact with the non-tactile 3D user interface. When user interface 20 is in the tracked state, the non-tactile 3D user interface can track and interpret gestures from the specific body part, e.g., hand 30. While in the not-tracked state, the non-tactile 3D user interface is not focusing on any specific individual or body part.

Active/Inactive. User interface 20 is active when the user interface is unlocked, engaged with and tracking user 22 and able to accept gestures from the user. When user 22 is disengaged from user interface 20, the non-tactile 3D user interface is inactive.

In embodiments of the present invention, the state of user interface 20 typically comprises a combination of the states described supra. The states of user interface 20 may include:
Tracked, Unlocked and Active.
Tracked, Unlocked and Inactive.
Not-Tracked, Unlocked and Inactive.
Not-Tracked, Locked and Inactive.
Tracked, Locked and Inactive.

Figure 7:
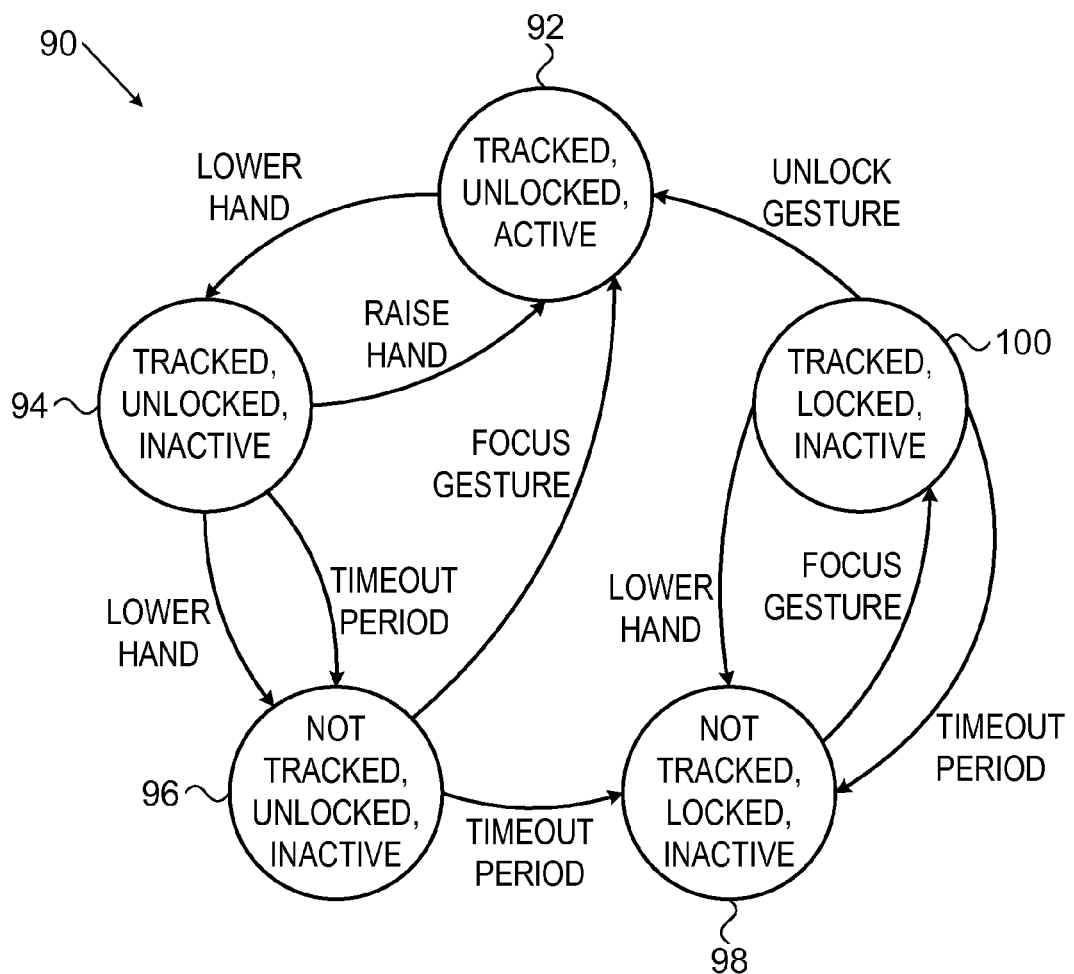
FIG. 7 is a state diagram that schematically illustrates states of the non-tactile 3D user interface, in accordance with embodiments of the present invention.

A state diagram detailing the transitions between the states of 3D user interface 20 is shown in FIG. 7, described hereinbelow.

To engage 3D user interface 20 while positioned in a field of view of sensing device 24, user 22 may perform a focus gesture. A well-designed focus gesture typically strikes a balance between ease of use and a low instance of false positives (i.e., a physical gesture that the computer incorrectly identifies as a focus gesture). On the one hand, a simple focus gesture (for example, pointing an index finger) may be easy to learn, but may be prone to generating excessive false positives. On the other hand, a complex focus gesture may generate few false positives, but may also be difficult for the user to learn. Typically, a well designed focus gesture has a false positive rate of less than 2%.

A focus gesture comprising multiple physical motions can be broken down into a series of steps performed in a specific sequence. In some embodiments, computer 26 conveys feedback to user 22 during and/or upon completion of each of the steps. The focus gesture steps should typically be distinct enough so as not to interfere with the operation of user interface 20 (i.e., by generating false positives). For example, if user interface 20 is configured to show movies from a movie library stored on the computer, the focus gesture steps should be sufficiently different from the gestures used to control the movie library (e.g., gestures that select and control playback of a movie).

A focus gesture, used to engage user interface 20, may include a "push" gesture or a "wave" gesture. As described in detail hereinbelow, the focus gesture may comprise user 22 performing, with hand 30, a first motion in a first direction along a selected axis (in space), followed a second motion in a second direction, opposite to the first direction, along the selected axis. In some embodiments, computer 26 conveys visual feedback to user 22 as the user performs and/or completes each step of the focus gesture. The feedback can help train user 22 to perform the focus gesture correctly.

Figure 2:
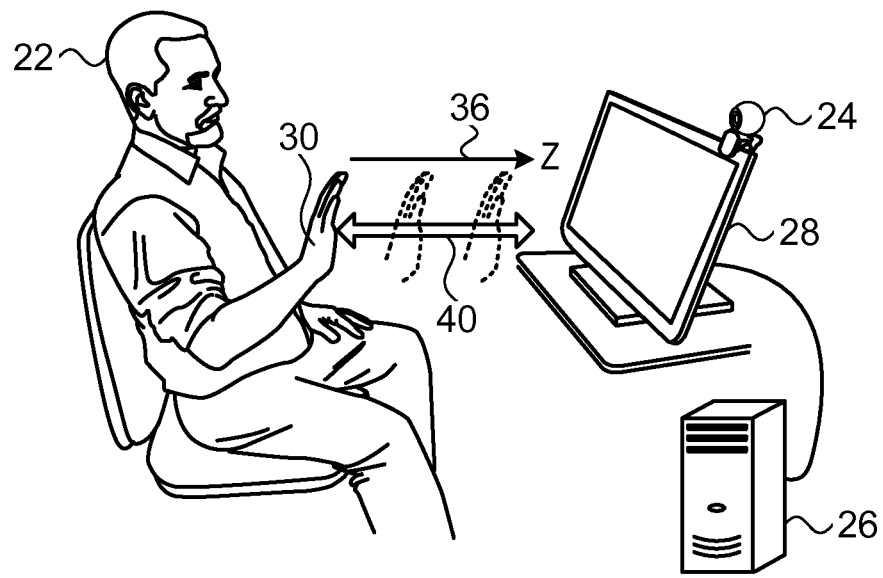
FIG. 2 is a schematic pictorial illustration of a user performing a push gesture, in accordance with an embodiment of the present invention.

FIG. 2 is a schematic pictorial illustration of user 22 performing a push gesture, in accordance with an embodiment of the present invention. The push gesture comprises user 22 performing a combination of the following:
A first motion comprising pushing hand 30 forward (i.e., towards display 28) at a minimum focus gesture speed and for at least a focus gesture distance along Z-axis 36.
A second motion comprising pulling hand 30 back (i.e., towards user 22) at a minimum focus gesture speed and for at least a focus gesture distance along Z-axis 36.

For example, the minimum focus gesture speed and the focus gesture distance may comprise 10 centimeters per second, and 10 centimeters, respectively. The forward and backward motions of the push gesture are indicated by arrows 40. As user 22 moves hand 30 along Z-axis 36, computer 26 receives, from sensing device 24, a set of multiple 3D coordinates representing the forward and backward motion of the hand (i.e., the push gesture). Upon detecting completion of the push gesture, computer 26 can transition user interface 20 from a first state (e.g., not tracked) to a second state (e.g., tracked).

Figure 3:
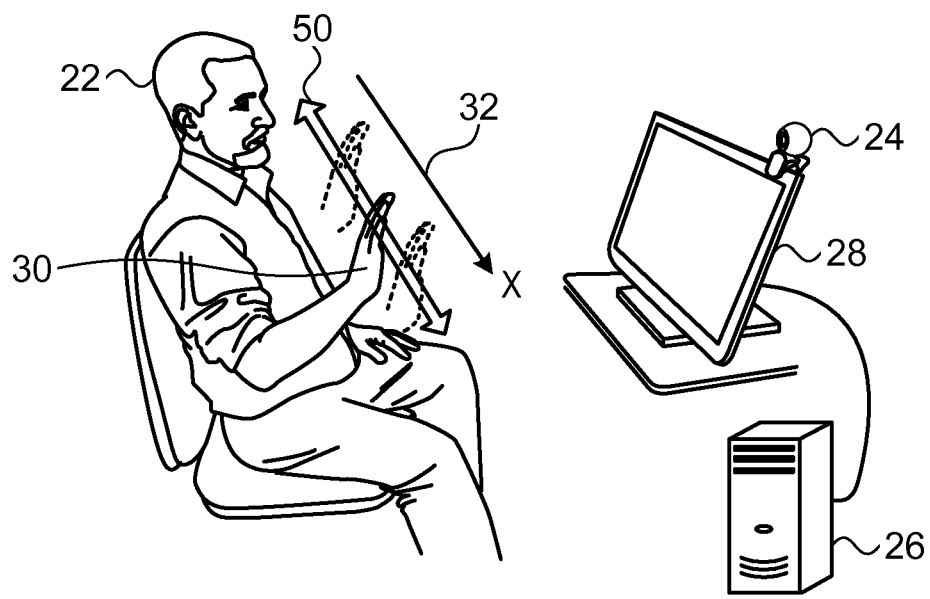
FIG. 3 is a schematic pictorial illustration of the user performing a wave gesture, in accordance with an embodiment of the present invention.

FIG. 3 is a schematic pictorial illustration of user 22 performing a wave gesture, in accordance with an embodiment of the present invention. The wave gesture comprises user 22 performing a combination of the following:
A first gesture comprising moving hand 30 in a swiping motion from a first side to a second side (i.e., either left-to-right right-to-left) at the minimum focus gesture speed, and for at least the focus gesture distance along X-axis 32.

A second gesture comprising moving hand 30 in a swiping motion from the second side to the first side at the minimum focus gesture speed, and for at least the focus gesture distance along X-axis 32.

The side-to-side swiping motions of the wave gesture are indicated by arrows 50. As user 22 moves hand 30 along X-axis 32, computer 26 receives, from sensing device 24, a set of multiple 3D coordinates representing the side-to-side motion of the hand (i.e., the wave gesture). Upon detecting completion of the wave gesture, computer 26 can transition user interface 20 from a first state (e.g., not tracked) to a second state (e.g., tracked).

Figure 4:
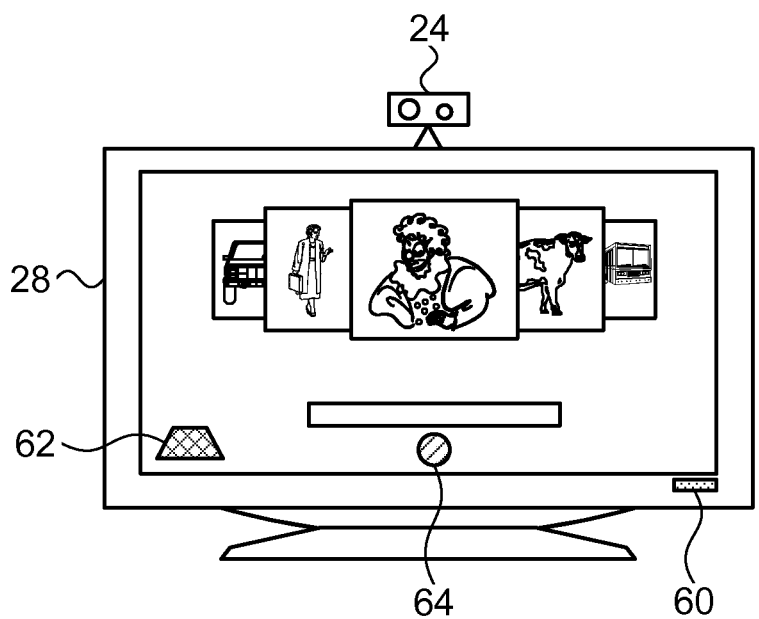
FIG. 4 is a schematic pictorial illustration of a computer conveying visual feedback to the user, as the user performs a focus gesture, in accordance with an embodiment of the present invention.

FIG. 4 is a schematic pictorial illustration of computer (i.e., via display 28) conveying visual feedback to user 22, as the user performs a focus gesture, in accordance with an embodiment of the present invention. In some embodiments, computer 26 may control a visual feedback device 60 coupled to display 28 and computer 26, such as a light emitting diode (LED) that may change color as user 22 performs the focus gesture.

The visual feedback may comprise a first visual feedback prior to the first gesture of the focus gesture, a second visual feedback subsequent to the first gesture, and a third visual feedback subsequent to the second gesture of the focus gesture. For example, prior to performing the focus gesture, user interface 20 can illuminate LED 60 in a first color, e.g., red. After user 22 performs the first gesture of the focus gesture (e.g., by pushing hand 30 towards sensing device 24 to initiate the push gesture or by swiping the hand from a first side to a second side to initiate the wave gesture), computer 26 can illuminate LED 60 in a second color, e.g., orange. Finally, after user 22 completes the second gesture of the focus gesture (e.g., by pulling hand 30 back from sensing device 24 to complete the push gesture or by swiping the hand back from the second side to the first side to complete the wave gesture), the computer can illuminate LED 60 in a third color, e.g., green, and engage user 22 with user interface 20.

In an additional embodiment, visual feedback device 60 may comprise a single color LED that blinks (i.e., illuminates and darkens) as user 22 performs a focus gesture. During periods between focus gestures, the single LED may be either constantly illuminated or darkened. In an alternative embodiment, visual feedback device 60 may comprise multiple LEDs that convey visual feedback to user 22 before, during and after performing the focus gesture (e.g., separate red, yellow and green LEDs as in a traffic light.

In a further embodiment, visual feedback device 60 may comprise a vertical or a circular array of LEDs. When user interface 20 is inactive, computer 26 darkens the LEDs. As user performs the focus gesture, computer 26 can illuminate an additional LED with each individual gesture (e.g., the side-to-side swipe of hand 30 for the wave gesture or the forward and backward motion of hand 30 for the push gesture). After user 22 completes the focus gesture, computer 26 can illuminate all the LEDs.

In still yet another embodiment, visual feedback device 60 may comprise a horizontal array of LEDs. When user interface 20 is disengaged, computer 26 can illuminate a single LED in the horizontal array. As user 22 performs the focus gesture, computer 26 can toggle the LEDs in the horizontal array to mimic the motion of hand 30.

Additionally or alternatively, computer 26 may alter a feedback item presented on display 28 while user 22 performs the focus gesture. For example, the feedback item may comprise a status icon 62 that either changes its appearance or displays an animation (e.g., a triangular shape within the icon that alters shape) during the focus gesture.

In alternative embodiments, the feedback item may comprise a circle 64 on display 28, and computer 26 can change the size of the feedback item depending on the location of hand 30 during the focus gesture. For example, as user 22 moves hand 30 closer to sensing device 24 to initiate a push gesture, computer 26 may increase the diameter of circle 64, or vice versa. Visual feedback conveyed by computer 26 may also include an indication as to the speed of the gesture (i.e. whether user 22 is moving hand 30 at an appropriate speed or not), and/or an indication when the hand has moved a sufficient distance to complete one of the focus gesture steps.

In further embodiments, the feedback may comprise a text message presented on display 28. For example, after user 22 performs the first gesture of the push gesture (i.e., moving hand 30 forward), computer 28 can present a text message such as "Pull hand back to gain control".

Unlock Gesture

In embodiments of the invention, states of 3D user interface 20 may include the locked and the unlocked states. The user interface may transition to the locked state either automatically after a defined period of inactivity, or after user 22 explicitly performs a lock gesture. While in the locked state, user 22 is disengaged from user interface 20. In some embodiments, user 22 performs the focus gesture followed by an unlock gesture, thereby unlocking and engaging user interface 20.

Alternatively, user interface 20 may implement a spatial aware gesture lock, where the state of the user interface may be unlocked for a specific region including user 22, but locked for other regions in proximity to the specific region (and therefore locked for any individuals in the other regions).

Examples of unlock gestures include an "up" gesture (e.g., raising hand 30 a specified distance), a sequence of two sequential wave gestures, and a sequence of two sequential push gestures, as described in detail hereinbelow.

Figure 5:
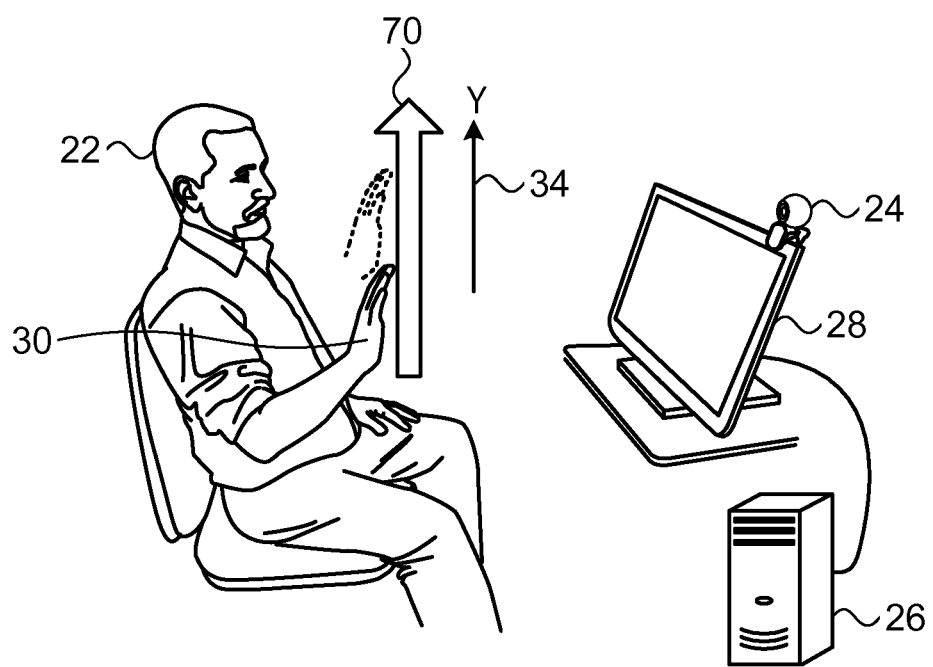
FIG. 5 is a schematic pictorial illustration of the user performing an up gesture, in accordance with an embodiment of the present invention.

FIG. 5 is a schematic pictorial illustration of user 22 performing an up gesture, in accordance with an embodiment of the present invention. The up gesture comprises user 22 raising hand 30 vertically, at a minimum unlock gesture speed, and for at least an unlock gesture distance along Y-axis 34, as indicated by arrow 70. For example, the minimum unlock gesture speed and the unlock gesture distance (i.e., for an unlock gesture such as the up gesture) map comprise four centimeters per second, and 20 centimeters, respectively.

As user 22 elevates hand 30 along Y-axis 34, computer 26 receives, from sensing device 24, a set of multiple 3D coordinates representing the rising motion of the hand (i.e., the up gesture). Upon detecting completion of the up gesture, computer 26 can transition user interface 20 from a locked state to an unlocked state.

While locked, the state of user interface 20 is typically not-tracked, locked and inactive. To unlock user interface 20, user 22 typically first performs a focus gesture, which transitions user interface 20 to the tracked, locked and inactive state. Upon detecting the focus gesture, computer 26 may convey feedback (either on display 28 or on device 60) prompting user 22 to elevate hand 30 to unlock the user interface (i.e., to perform the unlock gesture). Performing the unlock gesture engages the user interface, and transitions user interface 20 to the tracked, unlocked and active state.

As described supra, user 22 can unlock user interface 20 by performing two focus gestures sequentially. After detecting the first focus gesture, computer 26 transitions user interface 20 from the not-tracked, locked and inactive state to the tracked, locked and inactive state, and after detecting the second focus gesture, the computer transitions the non-tactile 3D user interface to the tracked, unlocked and active state. Thus, for example, unlocking user interface 20 may comprise user 22 performing either two wave gestures, two push gestures, or a combination of the two.

Computer 26 may also convey a first visual feedback to the user performing the unlock gesture, and a second visual feedback subsequent to the user performing the unlock gesture. For example, visual feedback device 60 may comprise a red LED that illuminates when user interface 20 is the locked state, and a green LED that illuminates when the user interface is in the unlocked state. In an alternative embodiment, visual feedback device 60 may comprise a multi-colored LED that changes color upon computer 26 transitioning user interface 20 to either the locked or the unlocked state.

In an additional embodiment, computer 26 may convey visual feedback via a feedback item presented on display 28. For example, the feedback item may comprise an icon 34 that is configured to show either a closed padlock or a closed eye when user interface 20 is in the locked state, and either an open padlock or an open eye when the user interface is the unlocked state.

Dropping Sessions

As hand 30 interacts with 3D user interface 20, the position of the hand may influence the state of the non-tactile 3D user interface. For example, if user 22 drops hand 30 to the user's lap, then the user may disengage from the non-tactile 3D user interface, with computer 26 transitioning user interface 20 from the tracked, active and unlocked state to the not-tracked, inactive and unlocked state. Upon detecting user 20 performing a focus gesture, computer 26 can transition user interface 20 back to the tracked, active and unlocked state, and reengages the user interface.

FIGS. 6A, 6B, 6C, and 6D are schematic pictorial illustrations of user interface 20 responding to vertical movement of hand 30, in accordance with an embodiment of the present invention. In the example shown in FIG. 6A, hand 30 can move between an active region 80, a pre-drop region 84 and dropped region 86, where each of the regions is associated with a state of 3D user interface 20. As shown in the figure, active region 80 is associated with a tracked and active state, pre-drop region 84 is associated with a tracked and inactive state, and dropped region 86 is associated with a not tracked and inactive state.

In operation, computer 26 defines multiple regions comprising at least a first region and a second region within a field of view of sensing device 24, and associates each of the defined regions with a state of user interface 20. As user 22 moves hand 30 from the first region (e.g., region 80) to the second region (e.g., region 82), computer 26 receives a set of multiple 3D coordinates representing the hand moving from the first region to the second region. Upon detecting hand 30 moving from the first region to the second region, computer 26 responsively transitions 3D user interface 20 from the state associated with the first region to the state associated with the second region.

Figure 6:
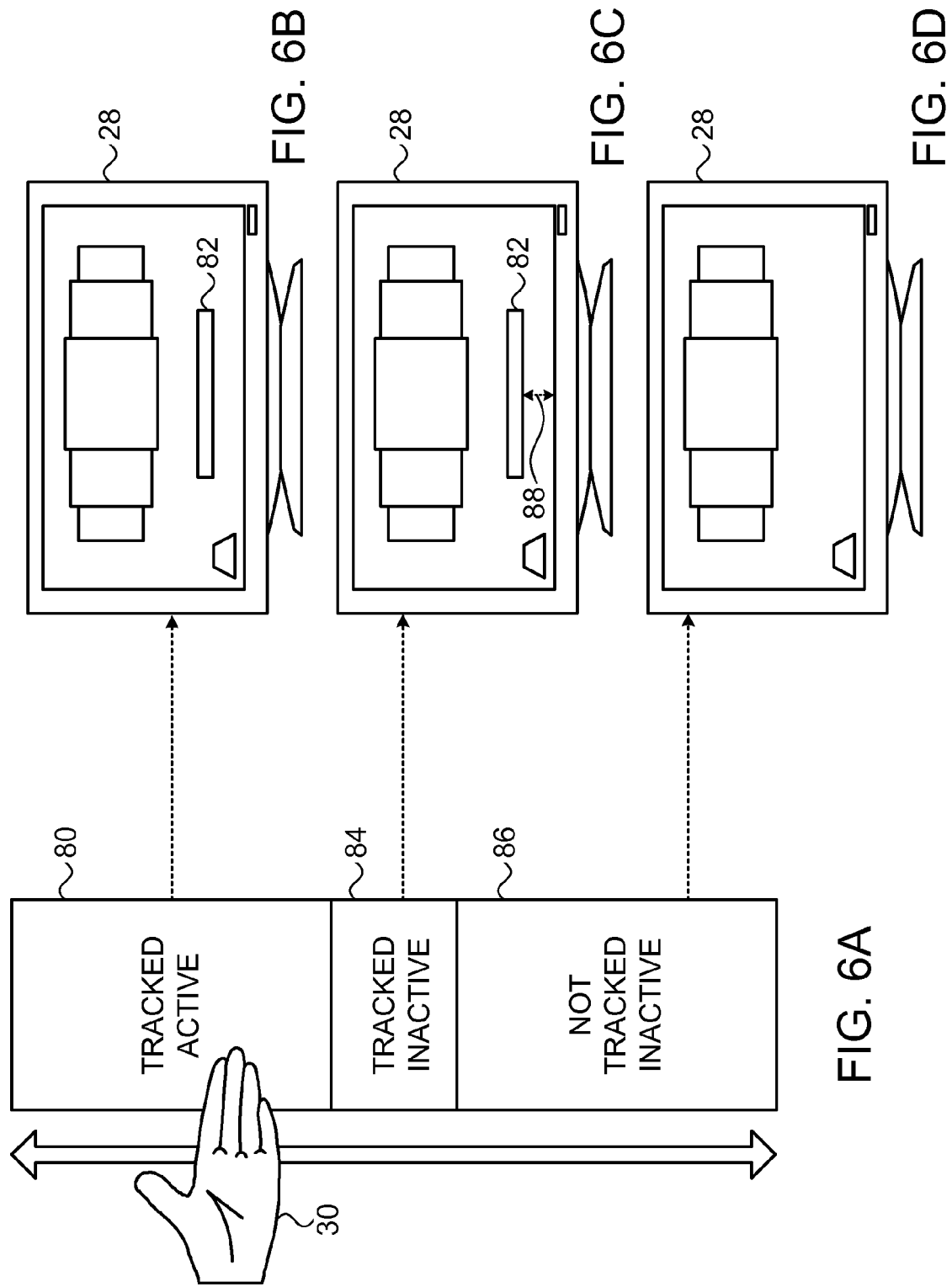
FIGS. 6A, 6B, 6C, and 6D are schematic pictorial illustrations of the non-tactile 3D user interface responding to vertical movement of the user's hand, in accordance with an embodiment of the present invention.

While hand 30 is within active region 80, user interface 20 may respond to gestures performed by the hand, as the state of the 3D user interface is tracked, active and unlocked. In some embodiments, computer 26 may convey visual feedback to user 22 indicating a current state of 3D user interface 20. For example, while positioned within region 80, hand 30 may interact with user interface 20 via a softbar 82, as shown in FIG. 6B. Softbar 82 may also be referred to as a horizontal bar user interface. While hand 30 interacts with softbar 82, computer 26 may position the softbar at a fixed location on display 28. A non-tactile 3D user interface incorporating softbar 82 is described, for example, in U.S. patent application Ser. No. 13/161,508, filed Jun. 16, 2011, whose disclosure is incorporated herein by reference.

If user 22 lowers hand 30 from region 80 to pre-drop region 84, computer 26 transitions the state of user interface 20 to the tracked, inactive and unlocked state. While hand 30 is in region 84, the hand is disengaged from user interface 20 (i.e., the non-tactile 3D user interface may ignore gestures from the hand), but the non-tactile 3D user interface is still tracking the hand.

In some embodiments, while hand 30 is within region 84, computer 26 moves the vertical position of softbar 82 in synchronization with the hand, as indicated by arrows 88 in FIG. 6C. The vertical movement of softbar 82 conveys a "gentle" feedback to user 22 indicating a potential disengagement from user interface 20, should the user move hand 30 down to dropped region 86. If user 22 lowers hand 30 into region 86, computer 26 may not present softbar 82 (as shown in FIG. 6D), and the computer transitions the 3D user interface to the not-tracked, inactive and unlocked state.

To reengage user interface 20 while hand 30 is within region 84, user 22 can elevate the hand back to region 80, and computer 26 transitions the non-tactile 3D user interface back to the tracked, active and unlocked state. However, since the state of user interface 20 is not-tracked, inactive and unlocked while hand 30 is within region 86, the user may be required to perform a focus gesture in order to reengage the 3D user interface.

In some embodiments, active region 80 comprises a static region whose mid-point has a vertical coordinate where user 22 performed the focus gesture, thereby engaging user interface 20. In alternative embodiments, computer 26 may adjust boundaries of the regions responsively to recent movements of hand 30. For example, computer 26 may employ temporal filtering (or another similar algorithm) to update the mid-point, by periodically averaging the vertical coordinates of hand 30 when the hand performed recent gestures. By updating the mid-point, computer may also update the upper and lower boundaries of active region 80. Computer 26 can also use temporal filtering to assist in defining a horizontal (i.e., a side-to-side) active zone (not shown).

In some instances, hand 30 may engage user interface 20, but user 22 may be physically unable to lower the hand to pre-drop region 84. For example, user 22 may be sitting on a couch with hand 30 resting on an armrest. In response, computer 26 may "compress" regions 80, 84 and 86, thereby repositioning pre-drop region 84 to an appropriate (i.e., a reachable) level. Alternatively, computer 26 may present feedback, prompting user 22 to elevate hand 30 in order to engage the non-tactile 3D user interface. For example, computer 26 may only present the top half of softbar 82 at the bottom of display 28, thereby prompting the user to elevate hand 30 to a higher vertical position (at which point the softbar may be displayed in its entirety).

FIG. 7 is a state diagram 90 that schematically illustrates the states and the transitions of user interface 20, in accordance with embodiments of the present invention. When user 22 positions hand 30 in active region 80 and interacts with user interface 20, computer 26 sets the state the non-tactile 3D user interface to a tracked, unlocked and active state 92. Upon user 22 lowering hand 30 to pre-drop region 84, computer 26 disengages the hand from user interface 20, and the computer transitions the non-tactile 3D user interface from state 92 to a tracked, unlocked and inactive state 94. While in state 94, computer 26 still tracks hand 30, but may not accept any commands from the hand. Computer 26 transitions user interface 20 back to state 92, responsively to detecting that user 22 elevates hand 30 back to active region 80.

If user 22 lowers hand 30 from pre-drop region 84 to dropped region 86, computer 26 transitions user interface 20 from state 94 to a not-tracked, unlocked and inactive state 96. In some embodiments, computer 26 may activate a first time-out timer upon transitioning user interface 20 to state 94. If user 22 does not elevate hand 30 back to region 80 during a first specified (time) period, computer 26 transitions user interface 20 to state 96.

Computer 26 transitions user interface 20 from state 96 back to state 92 responsively to detecting user 22 performing a focus gesture as described supra. Upon transitioning to state 96, computer 26 activates a second time-out timer. If computer does not detect a focus gesture within a second specified period (e.g., ten seconds), then the computer transitions user interface 20 from state 96 to a not-tracked, locked and inactive state 98.

Computer 26 transitions user interface 20 from state 98 to state 92 (i.e., unlocking and reengaging the user interface) upon detecting user 22 performing a focus gesture, followed by an unlock gesture. Upon detecting user 22 performing the focus gesture, computer 26 transitions user interface 20 from state 98 to a tracked, locked and inactive state 100. When computer 26 transitions user interface 20 to state 100, the computer activates a third timeout timer. If computer 26 detects user 22 either moving hand 30 from active region 80 (the hand is within region 80 when performing the focus gesture) or not performing a focus gesture within a third specified period, then the computer transition user interface 20 from state 100 back to state 98. Finally, if user 22 performs an unlock gesture within the second specified period of time, then computer 26 transitions user interface 20 from state 100 to state 92.

Field of View

Figure 8:
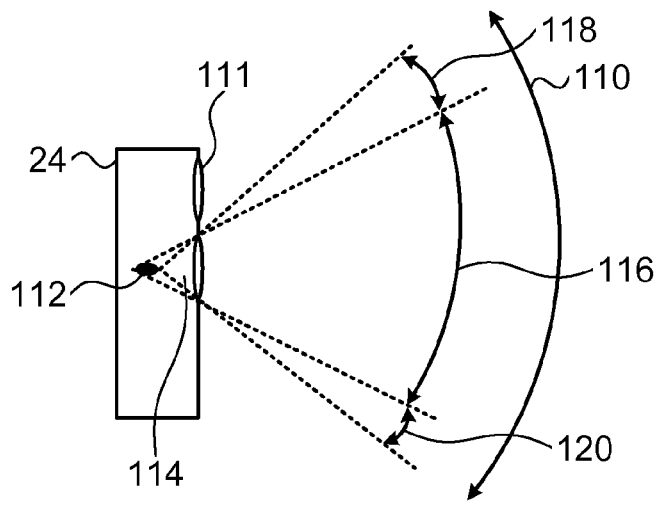
FIG. 8 is a schematic, pictorial illustration showing a sensing device configured to convey visual feedback to the user indicating the user's position relative to a field of view of the sensing device, in accordance with an embodiment of the present invention.

FIG. 8 is a schematic, pictorial illustration showing 3D sensing device 24 configured to convey visual feedback to user indicating the user's position relative to a field of view 110 of the 3D sensing device, in accordance with an embodiment of the present invention. Field of view 110 defines the volume of space that sensing device 24 can "see". 3D sensing device 24 comprises a 3D optical sensor 111 and an illumination element 112 that is configured to convey visual feedback to user 22 indicating when the user is located within field of view 110.

In the example shown in FIG. 8, illumination element 112 comprises a single light emitting diode (LED) positioned in proximity to an apex of a conical shaft 114, and where the LED is in proximity to optical sensor 111. Typically, when user 22 is within field of view 110, the user can see the LED.

Field of view 110 comprises a central field of view 116 bounded by peripheral fields of view 118 and 120. In some embodiments, user 22 sees the entire illumination element (e.g., a circle) when the user is within central field of view 116. As user 22 moves to periphery fields of view 118 or 120, the user may only see part of the illumination element (e.g., a semicircle). In other words, if user 22 can see any part of the illumination element, then optical sensor 111 can see the user.

In some embodiments, conical shaft 114 may include a customized slit (not shown), thereby enabling 3D sensing device 24 to present the illumination emanating from the illumination element as a specific shape (e.g., a company logo). In alternative embodiments, illumination element 112 may comprise multiple (e.g., three) LEDs positioned on 3D sensing device 24, where each of the multiple LEDs has a different field of view. When user 22 sees all the LEDs, the user is within field of view 110.

In an additional embodiment, illumination element 112 may be configured to convey visual feedback to user 20 indicating a current state of 3D user interface 20 to the user. In some embodiments, illumination element 112 may comprise multiple LEDs that are configured to present session indications (e.g., the state of user interface 20) to different individuals within field of view 110. For example, each of the multiple LEDs may comprise mechanical and/or optical elements that restrict each of the LEDs to different fields of view. Embodiments comprising multiple LEDs with different fields of view can also be used to convey feedback to multiple individuals within field of view 110.

In further embodiments, computer 26 may associate each state of user interface 20 with a specific color, and illumination element 112 may be configured to illuminate in different colors, based on the current state of the non-tactile 3D user interface. For example, while user interface 20 is in tracked, unlocked and active state 92 to user 22, computer 26 can illuminate illumination element 112 in green. Likewise, while user interface 20 is in tracked, unlocked and inactive state 94 to user 22, computer 26 can illuminate illumination element 112 in yellow, thereby conveying an indication to the user to raise hand 30 to region 80.

In still yet another embodiment, field of view 110 may comprise multiple regions (no shown), where additional users (not shown) in each region have a different state with user interface 20. For example, a first given user 22 positioned in a first given region can be in the locked state with 3D user interface 20, and a second given user 20 in a second given region can be in the active state with the non-tactile 3D user interface. Additionally, illumination element 112 can be configured to convey different visual feedback (e.g., different colors) to each of the regions, depending on their state with user interface 20. For example, visual feedback conveyed to the first given user a red illumination indicating that the first given user is positioned in a region that is in not tracked, unlocked and inactive state 94. Therefore to engage user interface 20, the first given user may be required to perform an unlock gesture.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:
1. A method, comprising:
receiving, by a computer executing a non-tactile three dimensional (3D) user interface, a set of multiple 3D coordinates representing a gesture by a hand positioned within a field of view of a sensing device coupled to the computer, the gesture comprising a rising motion along a vertical axis in space wherein the hand performs the rising motion for at least an unlock gesture distance at a minimum unlock gesture speed; and
transitioning the non-tactile 3D user interface from a locked state to an unlocked state upon detecting completion of the gesture.

2. The method according to claim 1, and comprising conveying a first visual feedback to the user prior to the gesture, and conveying a second visual feedback subsequent to the gesture.

3. The method according to claim 2, wherein the first and the second visual feedbacks comprise illuminating or darkening one or more visual feedback devices coupled to the computer.

4. The method according to claim 2, wherein the first and the second visual feedbacks comprise altering a feedback item presented on a display coupled to the computer.

5. The method according to claim 1, wherein the unlock gesture distance comprises 20 centimeters, and the minimum unlock gesture speed comprises four centimeters per second.

6. An apparatus, comprising:
a sensing device; and
a computer executing a non-tactile three dimensional (3D) user interface and configured to receive, from the sensing device, a set of multiple 3D coordinates representing a gesture by a hand positioned within a field of view of the sensing device, the gesture comprising a rising motion along a vertical axis in space wherein the hand performs the rising motion for at least an unlock gesture distance at a minimum unlock gesture speed, and to transition the non-tactile 3D user interface from a locked state to an unlocked state upon detecting completion of the gesture.

7. The apparatus according to claim 6, wherein the computer is configured to convey a first visual feedback to the user prior to the gesture, and to convey a second visual feedback subsequent to the gesture.

8. The apparatus according to claim 7, and comprising one or more visual feedback devices, wherein the computer is configured to convey the first and the second visual feedbacks by illuminating or darkening the one or more visual feedback devices.

9. The apparatus according to claim 7, and comprising a display, wherein the computer is configured to convey the first and the second visual feedbacks by altering a feedback item presented on the display.

10. The apparatus according to claim 6, wherein the unlock gesture distance comprises 20 centimeters, and the minimum unlock gesture speed comprises four centimeters per second.

11. A computer software product comprising a non-transitory computer-readable medium, in which program instructions are stored, which instructions, when read by a computer executing a non-tactile user interface, cause the computer to receive, from a sensing device, a set of multiple 3D coordinates representing a gesture by a hand positioned within a field of view of the sensing device, the gesture comprising a rising motion along a vertical axis in space wherein the hand performs the rising motion for at least an unlock gesture distance at a minimum unlock gesture speed, and to transition the non-tactile 3D user interface from a locked state to an unlocked state upon detecting completion of the gesture.

12. A method, comprising:
receiving, by a computer executing a non-tactile three dimensional (3D) user interface, a set of multiple 3D coordinates representing a gesture by a hand positioned within a field of view of a sensing device coupled to the computer, the gesture comprising a rising motion along a vertical axis in space;
determining whether the gesture of the hand included a rising of the hand by at least 20 centimeters; and
transitioning the non-tactile 3D user interface from a locked state to an unlocked state upon detecting completion of the gesture,
wherein the transitioning of the user interface from a locked state to an unlocked state is performed only if the upward gesture included a rise of the hand by at least 20 centimeters.

* * * * *